United States Patent [19]
O'Connor

[11] 3,740,519
[45] June 19, 1973

[54] ELECTRODE FOR ELECTRO-EROSION MACHINING ELECTRODE

[76] Inventor: Thomas J. O'Connor, 100 Morgan Road, Ann Arbor, Mich. 48106

[22] Filed: Mar. 27, 1972

[21] Appl. No.: 238,126

Related U.S. Application Data

[63] Continuation of Ser. No. 33,216, April 30, 1970, abandoned.

[52] U.S. Cl.............................. 219/69 E, 204/143 M
[51] Int. Cl............................. B23p 1/08, B23p 1/04
[58] Field of Search....................... 219/69 D, 69 E; 204/143 M

[56] References Cited
UNITED STATES PATENTS

| | | | |
|---|---|---|---|
| 3,058,895 | 10/1962 | Williams | 204/143 M |
| 3,467,807 | 9/1969 | Livshits et al. | 219/69 C |
| 3,469,058 | 9/1969 | O'Connor | 219/69 V |
| 3,479,479 | 11/1969 | O'Connor | 219/69 V |

FOREIGN PATENTS OR APPLICATIONS

| | | | |
|---|---|---|---|
| 264,684 | 9/1968 | Austria | 219/69 E |
| 856,340 | 12/1960 | Great Britain | 219/69 E |

*Primary Examiner*—R. F. Staubly
*Attorney*—Dale R. Small

[57] ABSTRACT

Apparatus for and a method of electro erosion machining with increased stock removal rate with a fine finish is disclosed. The electro erosion machining apparatus disclosed includes an electrode having a plurality of separate portions insulated from each other and separately connected to a single source of pulsed electrical energy whereby the current from the source of pulsed electrical energy is divided among the separate electrode portions to provide a small current for each electrode. The method of the invention includes varying the current passed through each portion of the electrode, limiting the current through each portion of the electrode to a single direction and moving the electrode transversely of the direction of movement of the electrode toward a workpiece during electrical erosion machining to provide rapid total form machining.

2 Claims, 6 Drawing Figures

Patented June 19, 1973
3,740,519
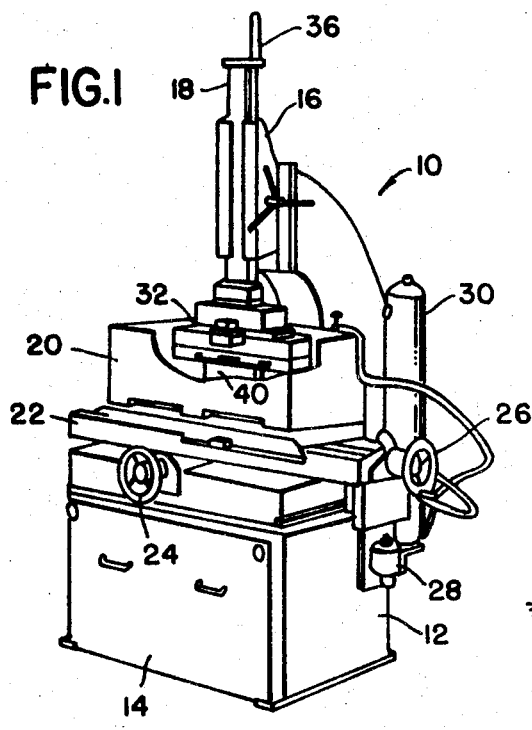
FIG.1
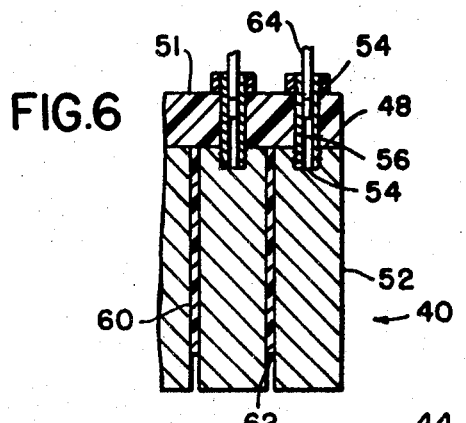
FIG.6
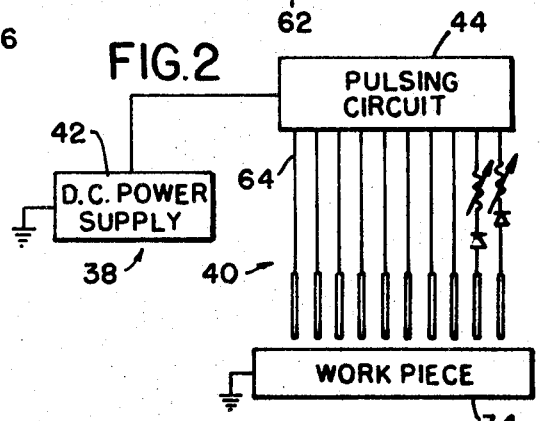
FIG.2
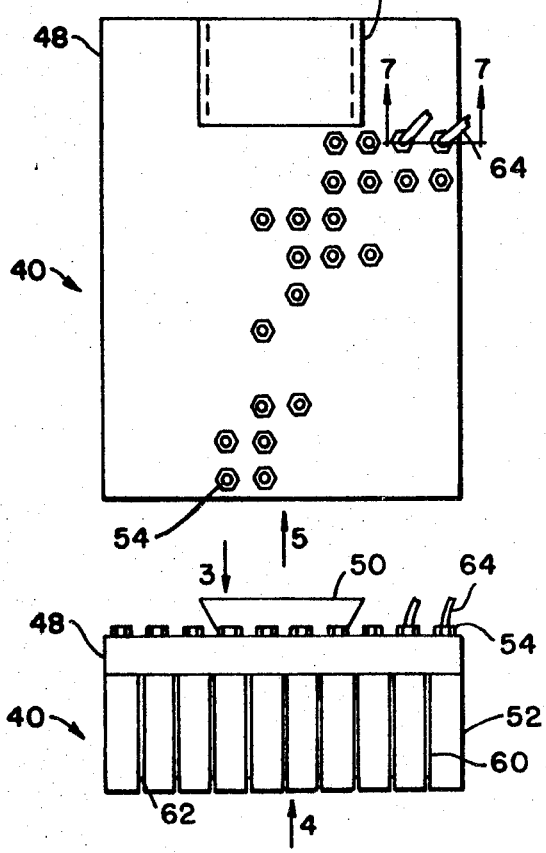
FIG.3
FIG.5
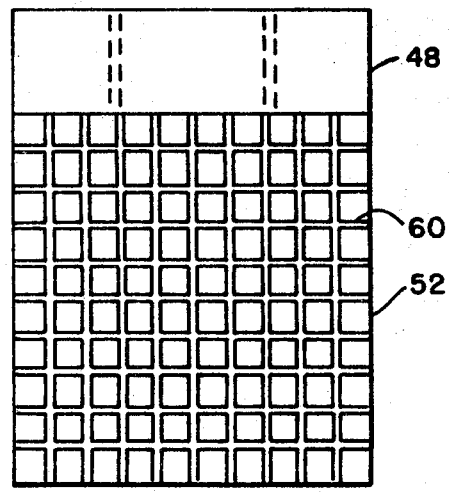
FIG.4
INVENTOR.
THOMAS J. O'CONNOR
BY Whittemore, Hulbert
& Belknap
ATTORNEYS

ELECTRODE FOR ELECTRO-EROSION MACHINING ELECTRODE

This is a continuation of application Ser. No. 33,216 filed Apr. 30, 1970, now abandoned.

BACKGROUND OF THE INVENTION

1. Field of the Invention

The invention relates to electro erosion machining and refers more specifically to a method of and apparatus for rapid total form electrical machining with maximum equipment efficiency including an electrode having a plurality of spaced apart and electrically insulated electrode portions, means for separately connecting each of the electrode portions to a single pulsed direct current power supply and means for moving the electrode toward or away from a workpiece in the presence of a dielectric fluid between the electrode and the workpiece while reciprocating the electrode transversely with respect to the direction of movement of the electrode toward the workpiece.

2. DESCRIPTION OF THE PRIOR ART

In the past, electro erosion machining apparatus has usually included a single member electrode of carbon, copper, brass or the like insulated from a support therefor and connected in its entirety to a source of direct current electrical energy. The electrode has been moved toward a workpiece in the presence of a fluid between the workpiece and electrode and a predetermined gap maintained therebetween by a servo system controlled in accordance with the voltage across or current through the gap between the electrode and workpiece.

In electrical discharge machining with such apparatus each spark includes the full current of the power supply at the voltage of the power supply and the sparking is random over the surface of the electrode. In order to obtain a fine finish on a workpiece, the power supply current must be held at a low level with present electro erosion machining apparatus. Reduction of the current reduces the stock removal rate of the apparatus so that fine finish electro erosion machining in the past has been slow and inefficient in the use of electro erosion machining power supplies. In addition, in the past it has not been possible to control the current passing through any particular portion of an electrode so that optimum machining of workpieces having, for example, parts of different hardnesses has not been possible.

SUMMARY OF THE INVENTION

In accordance with the invention, there is provided electro erosion machining apparatus and a method of electro erosion machining which more fully utilizes electro erosion machining power supplies in that maximum current ratings may be utilized in fine finish electro erosion. Further, with the electro erosion machining apparatus and method of the invention, separate control of the current passing through different portions of an electrode is possible to differently machine different portions of the same workpiece.

The apparatus of the invention includes an electrode having separate spaced apart and insulated electrode portions, means for separately connecting the separate electrode portions to an electro erosion machining power supply an means for varying the electrical energy from the power supply passed to each of the electrode portions connected in an electrical discharge machining circuit with a machine tool having means for moving the electrode toward and away from a workpiece, and an electro erosion power supply.

The method of the invention includes the steps of varying the current fed to each of the portions of the electrode, limiting the direction of current passed through each of the portions of the electrode, and moving the electrode in a direction transverse to the direction of movement of the electrode toward and away from a workpiece during electro erosion machining.

BRIEF DESCRIPTION OF THE DRAWINGS

FIG. 1 is a perspective view of the mechanical portion of electrical discharge machining apparatus constructed in accordance with the invention, including an electrode constructed in accordance with the invention for practicing the method of the invention.

FIG. 2 is a partly schematic partly diagrammatic illustration of the electrical portion of the electrical discharge machining apparatus illustrated in FIG. 1 connected to the electrode in the presence of a workpiece.

FIG. 3 is a top view of the electrode of the electrical discharge machining apparatus illustrated in FIGS. 1 and 2, taken in the direction of arrow 3 in FIG. 5.

FIG. 4 is a bottom view of the electrode illustrated in FIG. 1 taken in the direction of arrow 4 in FIG. 5.

FIG. 5 is an elevation view of the electrode illustrated in FIG. 1, taken in the direction of arrow 5 in FIG. 3.

FIG. 6 is an enlarged partial section view of the electrode illustrated in FIGS. 3 through 5, taken substantially on the line 6—6 in FIG. 3.

DESCRIPTION OF THE PREFERRED EMBODIMENT

As shown best in FIG. 1, the electrical discharge machining apparatus 10 includes a base 12 having a dielectric storage tank 14 therein and guides 16 for supporting a ram 18 thereon. A work tank 20 is positioned on table 22 carried by the base 14 for movement in perpendicular directions on actuation of the respective screw and nut mechanisms 24 and 26.

Apparatus 28 is further provided in conjunction with the base 12 for pumping dielectric fluid from the tank 14 into the work tank 20 and to return the dielectric fluid from the work tank 20 into the storage tank 14 in the base 12. The dielectric fluid may be passed through the filter 30 on its way to the work tank 20 from the storage tank 14.

An electrode holding tool 32 is secured the ram 18 for movement toward and away from a workpiece 34 in the tank 20 in response to servo mechanism 36. The tool 32 is move completely disclosed in U.S. Pat. No. 3,485,991. The details of the tool 32 will not, therefore, be included herein. Tool 32 serves to reciprocate the electrode 40 secured thereto in a transverse direction with respect to movement toward and away from the workpiece by the ram 18 to effect total form machining.

Similarly, the servo system operable in conjunction with a pulsating direct current power supply 38 will not be disclosed in detail herein but may be the servo system disclosed in U.S. Pat. No. 3,167,632.

The servo system serves to maintain a predetermined gap between the electrode 40 and the workpiece 34 in response to the voltage sensed across the electrode and workpiece with the apparatus 10 operating to produce electro erosion machining.

The electrical power supply 38 which forms a part of the electrical discharge machining apparatus 10 illustrated in FIG. 2 includes a power source 42 for direct current electrical energy and a pulsing circuit 44 operable to provide a direct current pulsed output on conductors 64 having a variable pulse repetition rate or frequency and a variable pulse width and height. Again, such circuits are known in the art and may be, for example, as disclosed in U.S. Pat. Nos. 2,876,386 and 3,020,448. The voltage from such sources may, for example, be 100 volts and the current supplied may be, for example, 100 amperes.

The electrode 40, as best shown in FIGS. 3 through 6, includes a rectangular base 48 of insulating material having a dovetail portion 50 extending from one side 51 thereof whereby the base 48 may be secured to the ram 18, as illustrated in U.S. Pat. No. 3,222,494, or to the tool 32 in conjunction with an appropriate adapter. Electrode portions 52 are secured to the base 48 by convenient means such as cylinders 54 threaded into portions 52 and extending through openings 56 in the electrode base 48. Nuts 58 secure the cylinders 54 at the top 51 of the base 48, as illustrated best in FIG. 6.

As shown best in FIG. 4, the electrode portions 52 are substantially square in cross section and are separated by a thin layer of insulating material 60 which is terminated short of the cutting ends of the electrode portions 52 as at 62 to prevent interference of the insulating material 60 with the cutting action of the electrode 40.

As shown in FIG. 4, an electrode having a cutting surface of 10 square inches may be divided into 100 portions 52, each being approximately 1 square inch in cross section. Each of the portions 52 of the electrode 40 is then connected by a separate insulated conductor 64 to a separate electrode portion 52 by means of a plug-in connection with a cylinder 54.

Thus, as shown best in FIG. 2, with a pulse of electrical energy from the power supply 38 being fed to each of 100 separate conductors 64 simultaneously, each of the conductors 64 and electrode portions 52 act as a separate parallel electrical discharge machining circuit in which separate sparks are generated between the electrode portions 52 and the workpiece 34. Since the circuits are in parallel through the electrode portions 52, the same 100 volts will be present between each electrode portion 52 and the workpiece 34. The total current, however, supplied by the power supply 38 of, for example, 100 amperes, will be divided between the electrode portions 52 to supply approximately 1 ampere between each separate electrode portion 52 and workpiece 34.

The finish on the workpiece 34 is thus much finer than would be obtained by providing a single spark with an electrical signal of 100 volts and 100 amperes. Further, there should be approximately 100 times more sparks at the lower ampere rating of 1 ampere per electrode portion 52 at the 100 volts. Thus, the electro erosion machining cutting rate with the electrode 40 in the circuit illustrated in FIG. 2 is substantially increased over the cutting rating, with a solid electrode 10 inches square.

As illustrated in FIG. 2, if it is desired to produce cutting at different rates or to vary the current through a particular electrode portion 52 due, for example, to a difference in the composition or grain structure of a workpiece at a particular point, resistances 68 which may be variable may be placed in any or all of the conductors 64 connected to the electrode portions 52. Thus, the total current of 100 amperes may be distributed over the total cutting surface of the electrode 40 in any desired configuration. To prevent interaction between the separate electrode portions 52, diodes 70 may be placed in the conductors 64 and used in conjunction with resistances 68 to permit current flow in only one desired direction between the electrode and workpiece.

As indicated above, the insulation 60 between the electrode portions 52 is stopped short of the cutting ends of the electrode portions 52 to prevent the insulation 62 from interfering with machining. The insulating material 60 may be sufficiently thin so that side cutting from the ends of the electrode portions 52 will prevent cores building up between the electrode portions 52.

In installations wherein the insulation 60 is required to be so thick that side cutting is insufficient to take care of elimination of cores between the electrode portions 52, the electrode 40 may be moved transversely of the direction of feed of the tool 32 as disclosed in U.S. Pat. No. 3,485,991. Alternatively, the electrode tool illustrated in U.S. Pat. application Ser. No. 545,652, filed Apr. 27, 1966, may be used to reciprocate the electrode 40 in two dimensions. As indicated in this patent and patent application, movement of the electrode 40 transverse to the axial movement thereof by the ram 18 will increase the efficiency of electro erosion by the electrode 40.

If less control of the parallel circuits formed by the electrode portions 52 is acceptable, it will be understood that the electrode 40 may be constructed so that the base 48 is conducting material electrically connected to each of the electrode portions 52 and that a single conductor may be provided from the power supply 38 connected to the base 48 having pulses of electrical energy thereon at the full voltage and current rating of the power supply. With such construction, the distribution of current through the individual electrode portions 52 will be less predictable. However, the finish provided on a workpiece and the length of time required to produce a predetermined finish with the structure disclosed herein is a considerable improvement over the same machining with a solid electrode having the same electro erosion machining power pulses applied thereto from power supply 38.

Also, it will be understood that the electrode portions 52 may be of any desired cross section such as round, triangular and the like, and in fact may be of different cross section in a single electrode 40.

While one embodiment of the present invention and modifications thereof have been considered in detail herein, it will be understood that other modifications and embodiments are contemplated. It is the intention to include all such embodiments and modifications as are defined by the appended claims within the scope of the invention.

What I claim as my invention is:

1. Apparatus for electrical erosion of a workpiece comprising a machine tool including a work tank for receiving a workpiece to be machined, a ram movable with respect to the tank toward and away from a workpiece positioned therein, an electrode secured to the ram including an insulating base, means secured to the base for securing the electrode to a ram or the like, a plurality of openings extending through the insulating base, a plurality of separate electrode portions having threaded recesses in one end thereof, hollow tubular members threaded at opposite ends extending through the openings in the insulating base and engaged at one end in the threaded recess in corresponding electrode portions on one side of the insulating base and nuts threadedly secured to the other ends of the tubular members on the other side of the insulating base for securing the separate electrode portions to the insulating base in spaced apart relation with respect to each other, insulating means positioned between the separate electrode portions for maintaining them in spaced apart relation, extending over most of the length of the electrode portions but in spaced relation from the end thereof opposite said one end of the electrode portions, a servo system operable in response to an electrical signal between the electrode and workpiece for maintaining a predetermined gap between the electrode and workpiece, means connected to the machine tool for flushing a fluid through the gap between the electrode and workpiece, a single power supply for supplying electrical energy to each of the separate portions of the electrode simultaneously to produce electro erosion or the workpiece, a separate diode and variable resistor connected in series between the power supply and each of the separate portions of the electrode for limiting current through each separate portion of the electrode individually and restricting the current therethrough to a unidirectional current, and means positioned between the ram and electrode for reciprocating the electrode transversely of the direction of movement of the ram toward and away from a workpiece.

2. An electrode for use in electrical erosion of a workpiece or the like, comprising an insulating base, means secured to the base for securing the electrode to a ram or the like, a plurality of openings extending through the insulating base, a plurality of separate electrode portions having threaded recesses in one end thereof, hollow tubular members threaded at opposite ends extending through the openings in the insulating base and engaged at one end in the threaded recess in corresponding electrode portions on one side of the insulating base and nuts threadedly secured to the other ends of the tubular members on the other side of the insulating base for securing the separate electrode portions to the insulating base in spaced apart relation with respect to each other, insulating means positioned between the separate electrode portions for maintaining them in spaced apart relation, extending over most of the length of the electrode portions but in spaced relation from the end thereof opposite said one end of the electrode portions and a separate diode and variable resistor connected in series with each of the separate portions of the electrode for limiting current through each separate portion of the electrode individually and restricting the current therethrough to a unidirectional current.

* * * * *